M. G. BEASLEY.
PLATE AND PAN LIFTER.
APPLICATION FILED JULY 31, 1907.

906,677.

Patented Dec. 15, 1908.

Witnesses
J. C. Simpson
F. G. Smith

Inventor
Mary G. Beasley
By
Attorneys ated above, the device is formed of sheet metal
UNITED STATES PATENT OFFICE.

MARY G. BEASLEY, OF DICKSON, TENNESSEE.

PLATE AND PAN LIFTER.

No. 906,677.  Specification of Letters Patent.  Patented Dec. 15, 1908.

Application filed July 31, 1907. Serial No. 386,385.

*To all whom it may concern:*

Be it known that I, MARY G. BEASLEY, a citizen of the United States, residing at Dickson, in the county of Dickson, State of Tennessee, have invented certain new and useful Improvements in Plate and Pan Lifters; and I do hereby declare the following to be a full, clear, and exact description of the invention, such as will enable others skilled in the art to which it appertains to make and use the same.

This invention relates to plate and pan lifters, and has for its object to provide a simple device of this character which may be stamped from sheet metal at one operation and which, will, by reason of this fact, be inexpensive of manufacture. I have found that present devices of this class are either too clumsy or too weighty for satisfactory use and that by forming such a device of sheet metal and of such construction that it may be manufactured at a single operation, a much lighter article is produced and one which will give better satisfaction.

In carrying out my invention, I have aimed to provide a device of this class of such construction that it may be quickly and readily stamped from a sheet of metal without the necessity of performing several operations as is now necessary in forming such devices and I have also aimed to obviate as far as possible any waste of material.

Figure 1:
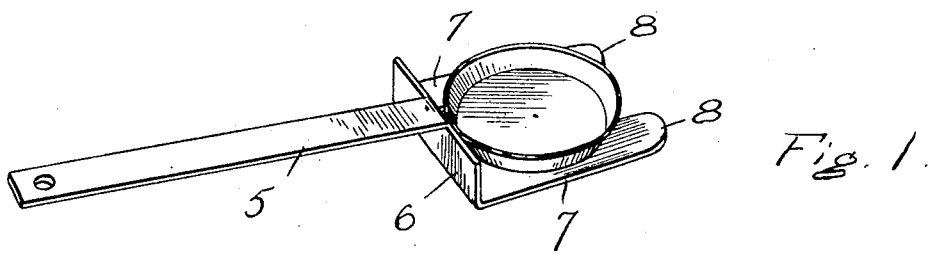
Figure 2:
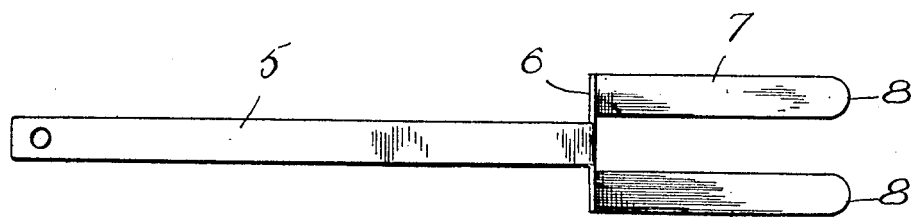
Figure 3:
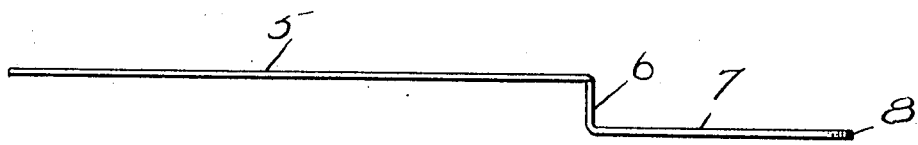
Figure 4:
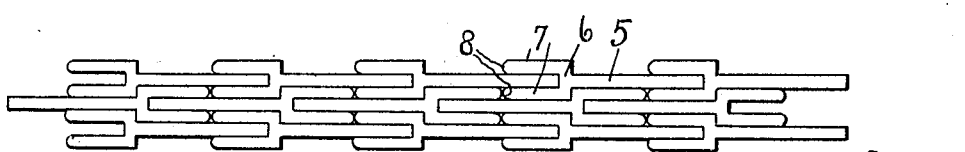

In the accompanying drawings, Figure 1 is a perspective view of the device showing manner of its use in lifting a pan, Fig. 2 is a top plan view of the device, and, Fig. 3 is a side elevation thereof, Fig. 4 is a plan view of a sheet of material or blank showing the manner in which the article embodying my invention is stamped therefrom.

As shown in the drawings, and as stated above, the device is formed of sheet metal and includes a handle 5 the longitudinal edges of which are parallel. At its forward end, this handle terminates in a transverse head 6, which is bent to extend at right-angles with respect to the handle, it being understood that the handle is integrally connected with the upper edge of the head at the middle thereof.

Formed integral with the lower edge of the head and extending at right-angles with respect thereto is a pair of tines or fingers 7 which have their extreme ends rounded as at 8, so as to permit of their ready engagement beneath a plate or pan. These tines extend, as stated, from the lower edge of the head and I have conceived the idea of extending them from the said edge at the ends thereof in this manner leaving a space between them which not only serves to lighten the article but also renders it less clumsy.

From the foregoing description of my invention it will be seen that I have produced an article of this class which may be manufactured at a low cost and will be very satisfactory. It will also be understood that in order to lift a pan or plate by means of this article, it is only necessary to engage the tines 7 beneath the plate or pan until the edge of the said plate or pan touches the head 6 at which time, the plate or pan will be firmly supported.

From the foregoing description of my invention and from an inspection of Fig. 4 of the drawings, it will be seen that I have provided a device of this class which may be stamped from a sheet of metal without any appreciable waste of material and that this result is attained principally through the feature of forming the handle and tines of the device of the same width and leaving a space between the tines equal in width to the width of the handle.

What is claimed, is,

As an article of manufacture, a plate lifter formed of a flat sheet of metal cut to form a body, two tines extending at right angles from one edge of the body, one to each side of the lengthwise middle thereof, and a handle extending at right angles from the opposite edge of the body, the handle having a width equal to the distance between the opposing longitudinal edges of the tines and being extended directly in a line with the longitudinal middle of the lifter.

In testimony whereof, I affix my signature, in presence of two witnesses.

MARY G. BEASLEY.

Witnesses:
P. H. GOOCH,
A. G. BEASLEY.